No. 871,457. PATENTED NOV. 19, 1907.
R. THAYER.
ELECTRICALLY PROPELLED VEHICLE.
APPLICATION FILED APR. 4, 1907.
FIG. I.
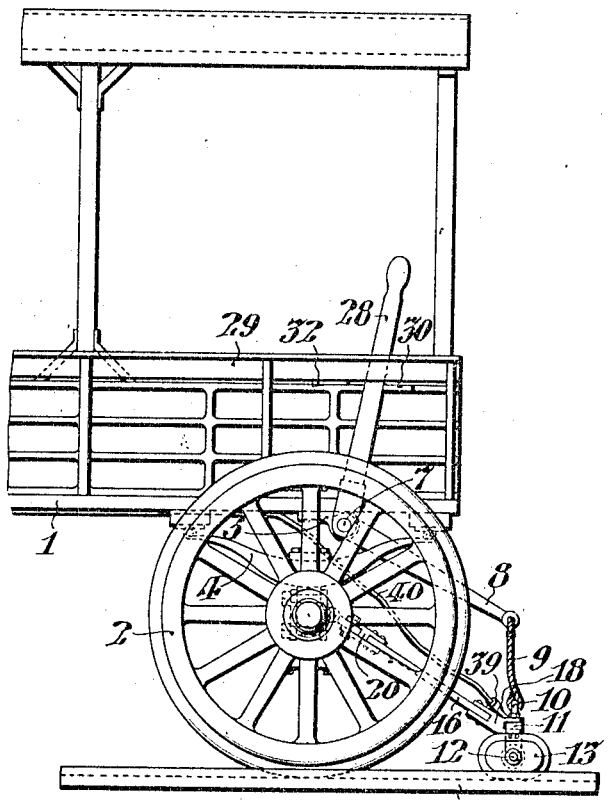
FIG. II.
FIG. III.
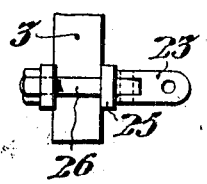
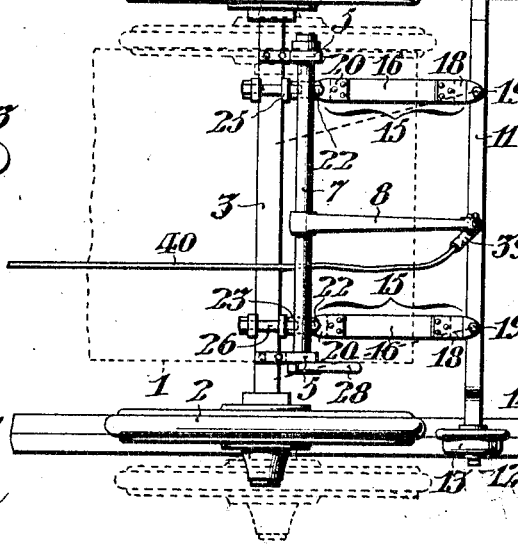
FIG. IV.
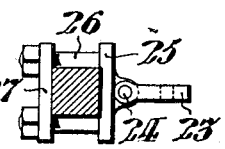
WITNESSES:
Clifton C. Hallowell
Thomas H. Kerr
INVENTOR:
RUSSELL THAYER,
By Arthur E. Paige
Atty.

UNITED STATES PATENT OFFICE.

RUSSELL THAYER, OF PHILADELPHIA, PENNSYLVANIA

ELECTRICALLY-PROPELLED VEHICLE.

No. 871,457.  Specification of Letters Patent.  Patented Nov. 19, 1907.

Application filed April 4, 1907. Serial No. 366,433.

*To all whom it may concern:*

Be it known that I, RUSSELL THAYER, of Philadelphia, in the State of Pennsylvania, have invented a certain new and useful Improvement in Electrically-Propelled Vehicles, whereof the following is a specification, reference being had to the accompanying drawings.

My improvement may be readily applied to any vehicle to provide an adjustable electrical connection between the vehicle and a subjacent rail conductor independently of the vehicle supporting wheels, but is particularly designed for an electrically propelled vehicle of the type shown in Letters Patent of the United States #12,449, reissued to me February 6th, 1906, *i. e.*, a vehicle which derives its motorcurrent alternately from an external supply system and from a storage battery carried by the vehicle.

In the form of my invention hereinafter described, two contact shoes, are suspended from a vehicle in such a manner that they may be lowered into electrical contact with the tracks of an ordinary street railway and be raised therefrom into idle position, at the will of the operator; the devices supporting said shoes permitting them to reciprocate horizontally, laterally with respect to the vehicle so as to facilitate the retention of electrical contact with said tracks, regardless of deviations of the vehicle therefrom, within the range for which the structure is adapted. Moreover, said supporting devices are so constructed and arranged that the axes of the contact shoes are maintained parallel with the axes of the supporting wheels of the vehicle, and said shoes parallel with the tracks; so as to register with the latter, when required, when the vehicle is traveling with its supporting wheels parallel with the tracks, regardless of whether said supporting wheels are on the tracks or merely adjacent thereto.

My invention comprises the various novel features of construction and arrangement hereinafter more definitely specified.

In the accompanying drawings; Figure I, is a fragmentary side elevation of a vehicle conveniently embodying my improvement. Fig. II, is a plan view of the mechanism shown in Fig. I; the outline of the vehicle body being indicated by dotted lines. Fig. III, is a larger plan view of one of the parallel link coupling yokes shown in Fig. II, attached to the axle of the vehicle supporting wheel. Fig. IV, is a side elevation of said yoke and axle as shown in Fig. III.

In said figures; the vehicle body 1, is provided with the supporting wheels 2, and axle 3, connected with said body by the springs 4. Said body is provided at its respectively opposite sides with similar bearing brackets 5, for the rock shaft 7, whose lever arm 8 is connected by the rope 9, or other suitable insulator, with the eye 10, of the contact supporting frame 11. Said frame 11, has the trunnions 12 at its opposite ends with the flanged contact shoes 13, journaled thereon and arranged to slide upon the tracks 14. Said shoes are preferably of flattened elliptical configuration, as shown in Fig. I, to afford a more extensive surface for contact with the tracks than if circular, but are capable of oscillatory movement on said trunnions 12, to ride over any obstruction on the tracks. Moreover, when said shoes become excessively worn upon one longitudinal contact surface, they may be rotatably reversed on said trunnions 12, to present the opposite longitudinal surface in contact with the tracks.

As indicated in Fig. I, the frame 11 is arched between the contact shoes 13 to avoid obstructions on the road bed between the tracks 14, and is pivotally secured to the axle 3, by the parallel insulating links 15. Said links comprise respective bars 16, of nonconducting material, for instance, wood, having their rear ends provided with metal clevises 18, pivoted to the frame 11 at 19, and having their forward ends provided with metal clevises 20, pivoted at 22, to the hinge leaves 23, which are pivoted at 24, to the coupling yokes 25, which are rigidly secured on the axle 3, by the stud bolts 26, extending through the plates 27.

It is to be noted that the pivots 19 and 22, permit the links 15 to carry the frame 11 laterally, in a horizontal plane, to retain said shoes 13 on respective tracks 14 when the vehicle is traversing a curved portion of said tracks, or is slightly digressing therefrom. Moreover, said frame may be independently oscillated vertically, with said leaves 23, turning on their pivots 24, to raise said contact shoes 13 from engagement with said tracks; by means of said lever arm 8, which is actuated by the hand lever 28. Said lever 28, is secured on the rock shaft 7, and extends upwardly between the vehicle body 1, and the shelving 29, convenient to the operator in said vehicle, and is limited in its rearward movement by the stop 30, when the shoes 13, are in engagement with the rails 14, but is arranged to be held by the lug 32, when shifted to its forward position to uplift said shoes from said rails as shown in dotted lines in Fig. I. Said frame 11, is provided with the coupling 39, secured beneath said eye 10, and provided with the electrical conductor 40, which connects with said shoes 13.

I do not desire to limit myself to the precise details of construction and arrangement herein set forth, as it is obvious that various modifications may be made therein without departing from the essential features of my invention.

I claim:—

1. In an electrically propelled vehicle, the combination with means providing an adjustable electrical connection between the vehicle and a stationary conductor; comprising a frame pivoted to said vehicle and arranged for lateral movement with respect thereto; reversible electrical contacts pivoted on said frame in operative relation with said conductor; and, a rock shaft carried by said vehicle and connected to withdraw said electrical contacts from said stationary conductor, substantially as set forth.

2. In an electrically propelled vehicle, the combination with means providing an adjustable electrical connection between the vehicle and a stationary conductor; comprising a frame pivoted to said vehicle and arranged for lateral movement with respect to the vehicle; links pivotally connecting said frame with the axle of said vehicle arranged to maintain said frame parallel therewith; electrical contacts carried by said frame in operative relation with said conductor; and, a rock shaft carried by said vehicle and connected to withdraw said electrical contacts from said stationary conductor, substantially as set forth.

3. In an electrically propelled vehicle, the combination with means providing an adjustable electrical connection between the vehicle and a stationary conductor; comprising a frame pivoted to said vehicle and arranged for lateral movement with respect to the vehicle; links comprising bars of non-conducting material provided at their opposite ends with clevises pivotally connecting said frame with the axle of said vehicle and arranged to maintain said frame parallel therewith; electrical contacts carried by said frame in operative relation with said conductor; and, a rock shaft carried by said vehicle and connected to withdraw said electrical contacts from said stationary conductor, substantially as set forth.

4. In an electrically propelled vehicle, the combination with means providing an adjustable electrical connection between the vehicle and a stationary conductor; comprising a frame; electrical contacts carried by said frame; a yoke secured to the axle of said vehicle; a leaf hinged to said yoke, having its axis parallel with said axle; and links pivotally connecting said frame and said leaf, arranged to swing in planes radial with respect to the horizontal axis of said leaf, substantially as set forth.

5. In an electrically propelled vehicle, the combination with means providing an adjustable electrical connection between the vehicle and a stationary conductor; comprising a frame pivoted to said vehicle; electrical contacts journaled on said frame; a rock shaft; a lever arm on said rock shaft; whose free end is connected with said frame; and a hand lever arranged to rock said shaft, and accessible from said vehicle, substantially as set forth.

6. In an electrically propelled vehicle, the combination with means providing an adjustable electrical connection between the vehicle and a stationary conductor; comprising a frame pivoted to said vehicle; electrical contacts journaled on said frame; a rock shaft; a lever arm on said rock shaft, whose free end is connected with said frame; a hand lever arranged to rock said shaft; and means arranged to limit the movement of said hand lever, substantially as set forth.

7. In an electrically propelled vehicle, the combination with means providing an adjustable electrical connection between the vehicle and a stationary conductor; comprising a frame pivoted to said vehicle; electrical contacts journaled on said frame; a rock shaft; a lever arm on said rock shaft, whose free end is connected with said frame; a hand lever arranged to rock said shaft; means arranged to limit the movement of said hand lever; and means arranged to engage said lever to maintain said contacts away from said stationary conductor, substantially as set forth.

8. In an electrically propelled vehicle, the combination with contact devices adapted to register with the respective tracks; of a pair of parallel link levers pivotally connecting said contact devices with said vehicle, whereby said contact devices may be shifted transversely with respect to said vehicle, substantially as set forth.

9. In an electrically propelled vehicle, the combination with contact devices adapted to register with the respective tracks; of a pair of parallel link levers, having horizontal and vertical axes, pivotally connecting said contact devices with said vehicle, whereby said contact devices may be shifted vertically and horizontally with respect to said vehicle, substantially as set forth.

10. In an electrically propelled vehicle, the combination with leaves supported by the vehicle to oscillate on horizontal axes; parallel links pivoted to said leaves on vertical axes; a contact frame pivoted to said links on vertical axes; and contacts carried by said frame in spaced relation corresponding with the opposed parallel tracks, substantially as set forth.

11. In an electrically propelled vehicle, means providing an adjustable electrical connection between the vehicle and a stationary conductor; comprising a frame pivoted to said vehicle and arranged for lateral movement with respect thereto; reversible elliptical electrical contacts pivoted on said frame in operative relation with said conductor; and, means carried by said vehicle and connected to withdraw said electrical contacts from said stationary conductor, substantially as set forth.

12. In an electrically propelled vehicle, means providing an adjustable electrical connection between the vehicle and a stationary conductor; comprising independently reversible elliptical electrical contacts carried by said vehicle in operative relation with said conductor, substantially as set forth.

13. In an electrically propelled vehicle, means providing an adjustable electrical connection between the vehicle and a stationary conductor; comprising independently reversible elliptical electrical contacts carried by said vehicle in operative relation with said conductor; and, means carried by said vehicle and connected to withdraw said electrical contacts from said stationary conductor, substantially as set forth.

14. In an electrically propelled vehicle, means providing an adjustable electrical connection between the vehicle and a stationary conductor; comprising a frame; links coupled for parallel movement and pivotally connecting said frame with said vehicle; and, electrical contacts carried by said frame in operative relation with said conductor, substantially as set forth.

15. In an electrically propelled vehicle, means providing an adjustable electrical connection between the vehicle and a stationary conductor; comprising a frame; links coupled for parallel movement and pivotally connecting said frame with said vehicle; electrical contacts carried by said frame in operative relation with said conductor; and, means carried by said vehicle and connected to withdraw said electrical contacts from said stationary conductor, substantially as set forth.

In testimony whereof, I have hereunto signed my name at Philadelphia, Pennsylvania, this second day of April, 1907.

RUSSELL THAYER.

Witnesses:
 AMBROSE F. FOW,
 JOSEPH R. GEORGE.